United States Patent [19]
Locatelli et al.

[11] Patent Number: 5,646,533
[45] Date of Patent: Jul. 8, 1997

[54] INDUCTION MEASUREMENT IN THE PRESENCE OF METALLIC, MAGNETIC WALLS

[75] Inventors: Marcel Locatelli, Montbonnot; Jean-Jacques Chaillout, St. Etienne de Crossey; Michel Brochier, Jarrie, all of France

[73] Assignee: Commissariat a l'Energie Atomique, France

[21] Appl. No.: 570,086

[22] Filed: Dec. 11, 1995

[30] Foreign Application Priority Data

Dec. 9, 1994 [FR] France .................................. 94 14848

[51] Int. Cl.⁶ .................................................. G01V 3/28
[52] U.S. Cl. ........................................ 324/339; 324/345
[58] Field of Search .................................. 324/220, 221, 324/338, 339, 346, 368

[56] References Cited

U.S. PATENT DOCUMENTS

| | | | |
|---|---|---|---|
| 2,194,229 | 3/1940 | Johnston et al. ............ | 324/221 X |
| 2,770,773 | 11/1956 | Cooley ......................... | 324/37 |
| 3,277,363 | 10/1966 | Schuster ...................... | 324/346 X |
| 4,748,415 | 5/1988 | Vail ............................... | 324/339 |
| 5,038,107 | 8/1991 | Gianzero et al. ............ | 324/339 |
| 5,283,520 | 2/1994 | Martin et al. ................ | 324/220 |
| 5,426,367 | 6/1995 | Martin et al. ................ | 324/339 |

OTHER PUBLICATIONS

Doll; "Introduction To Induction Logging and Application To Logging Of Wells Drilled With Oil Base Mud"; Jun. 1949; pp. 148–162; Petroleum Transactions, AIME.

Kojima et al; "Polymer-Alanine Dosimeter and Compact Reader"; 1989; pp. 851–857; Journal of Radiation Applications and Instrumentation.

*Primary Examiner*—Gerard R. Strecker
*Attorney, Agent, or Firm*—Hayes, Soloway, Hennessey, Grossman & Hage, P.C.

[57] ABSTRACT

A device for induction measurement of a medium adjacent a cylindrical, metallic, magnetic walled well of a well casing includes at least two magnetic circuits for magnetically saturating the metallic wall. Each of the magnetic circuits has a plate-like central portion, situated between two lateral portions, each of which lateral portions has a lateral end which comes into contact with the wall, along a zone parallel to the cylindrical axis of the wall. After magnetic saturation of the metallic wall, an induction signal is induced into the medium beyond the metallic wall and retransmitted by the medium in response to the induction signal.

13 Claims, 4 Drawing Sheets

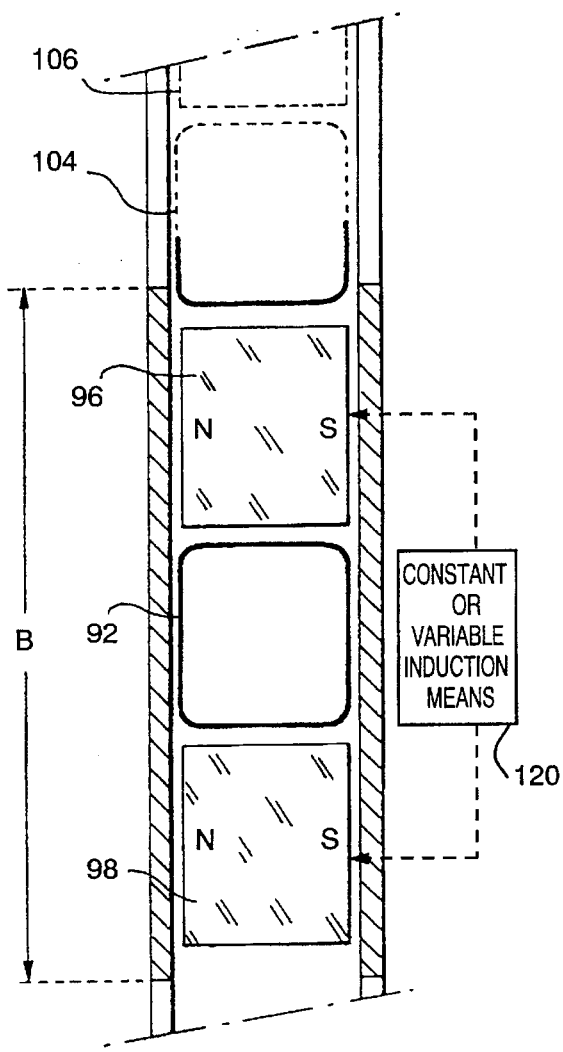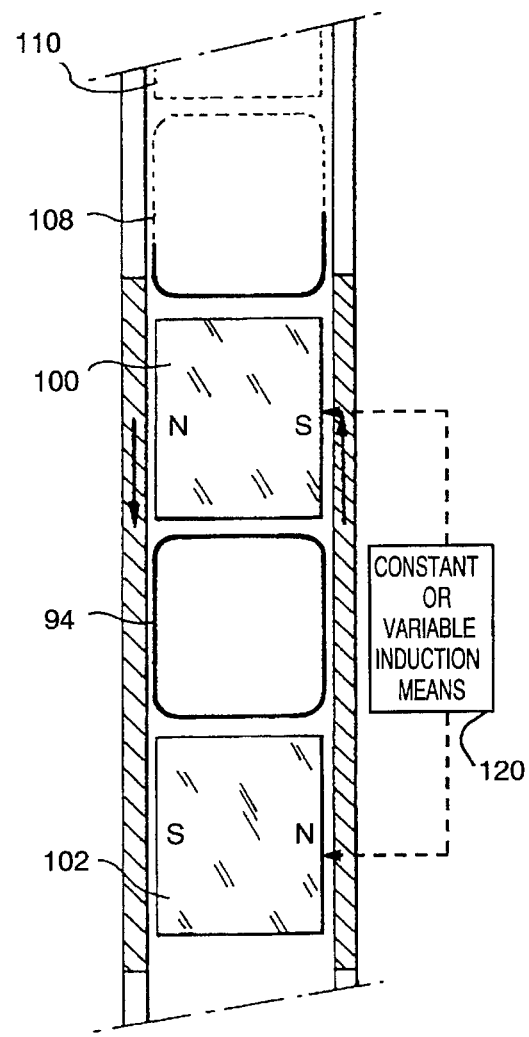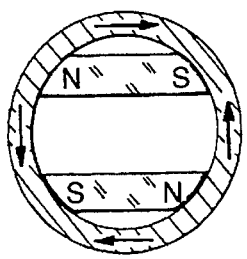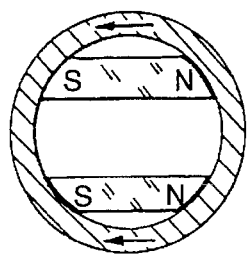

5,646,533

INDUCTION MEASUREMENT IN THE PRESENCE OF METALLIC, MAGNETIC WALLS

TECHNICAL FIELD

The present invention relates to the field of the characterization of geological formations traversed by a cased or drilled well. In particular, the characterization can take place with the aid of an induction procedure, such as that described by H. G. Doll entitled "Introduction to induction logging and application to logging of wells drilled with oil based mud", Petroleum Transactions, pp 148-162, 1949.

The invention is applicable in the case where the well wall is made from a soft magnetic material.

The knowledge of certain electrical or magnetic parameters of geological formations (e.g. the electrical resistivity or magnetic permeability) is of very considerable interest in the oil exploration and working field. In particular, in the working or operating field, the knowledge of the water-oil interface is vital. In the case of wells using oil based mud, the induction method is the only one which can be used.

PRIOR ART

In the presence of a metal casing of a well, in order to carry out induction-based measurements, it is necessary to saturate the metallic material constituting the tube, in order to make it magnetically transparent.

U.S. Pat. No. 5,038,107 describes a device having a generally axial configuration and having in particular a saturator with a flux concentrator, as well as induction focussing ferrites. This device suffers from a major disadvantage associated with the axial configuration in the sense that it requires the use of a saturation magnetic flux concentrator in order to ensure a better magnetic contact between the saturator and the tube. Moreover, despite the use of said concentrator, said configuration leads to significant magnetic energy losses. This represents a problem, because the magnetic energy available at the location where the measurement is performed is limited. Finally, the efficiency of such a system is highly dependent on the internal diameter of the tube and the irregularities of the diameter always lead to disturbances and interference with respect to the measurement.

The present invention aims at solving these problems. More particularly, it proposes a device for the induction measurement of a medium, in the presence of a substantially cylindrical, metallic, magnetic wall having:

means for saturating the magnetic wall, means permitting the induction of a signal in the medium beyond the magnetic wall, means for receiving a signal retransmitted by the medium in response to the previously induced signal, characterized in that the means for saturating the magnetic wall are constituted by at least two magnetic circuits for direct application to the metal wall, during the measurement by induction, each magnetic circuit having:

plate-like central portion, two lateral portions, whereof the end of the lateral portions comes into contact with the inner wall of the tube, along a zone parallel to the axis of said tube.

With this device, there is a direct magnetic attraction force between the metallic wall and the magnetic circuits, which makes it possible to reduce the gaps between the saturators and the tube and therefore the magnetic energy losses necessary for the saturation of the casing.

As a result of the direct magnetic contact between the wall and the saturator, the efficiency of the measuring device according to the invention is not dependent on the internal diameter of the tube, or on irregularities from which said diameter may suffer. Thus, in the prior art device, such irregularities inevitably lead to interference to the measurement. These interferences disappear when using a device according to the invention.

The central part can be constituted by metal sheets and the lateral parts can in each case be constituted by metal sheets or by metal elements forming a spring. This solves the problem of the adaptation of the contact between the lateral parts and the wall when the latter has irregularities.

In addition, cutouts can be made in at least one lateral part, said cutouts ensuring an even better adaptation of each magnetic circuit to the surface of the tube wall.

According to another aspect, two magnetic circuits can be arranged substantially in parallel, the induction and detection means being located between said two circuits.

According to another aspect, several saturator assemblies, each constituted in the manner described hereinbefore, can be provided, the different assemblies being arranged on a common axis, with a particular mutual spacing, and excitation and reception means are located in the free space between two neighbouring assemblies.

This configuration makes it possible to provide more space for the transmitter-receiver assembly and also to use larger magnetic circuits, so that more magnetic energy can be injected into the wall to be saturated. Thus, in the configuration according to which the transmission and reception means are positioned between two magnetic circuits, the available volume for said circuits is necessarily limited. If this limitation causes a problem, the alternate configuration of saturator-measuring means and saturator is particularly appropriate.

Two circuits of the same group of saturators can then be arranged so as to have the same magnetic orientation. In this case, the magnetic orientations of two neighbouring assemblies can be at 180° from one another, or 90° from one another. This then leads to an axial saturation.

According to a variant, in each saturator group, the two magnetic circuits can be arranged so as to have an opposing magnetic orientation, which leads to a radial configuration.

Finally, in an induction-based measuring device according to the invention, means can be provided for subjecting the saturators to a time-variable induction. It is therefore possible to make the device operate according to a magnetic "chopper" mode, so that the signal-to-noise ratio of the measurement performed can be improved.

BRIEF DESCRIPTION OF THE DRAWINGS

The features and advantages of the invention can be better gathered from the following description of illustrative and non-limitative embodiments, with reference to the attached drawings, wherein show.

3

Figure 5:
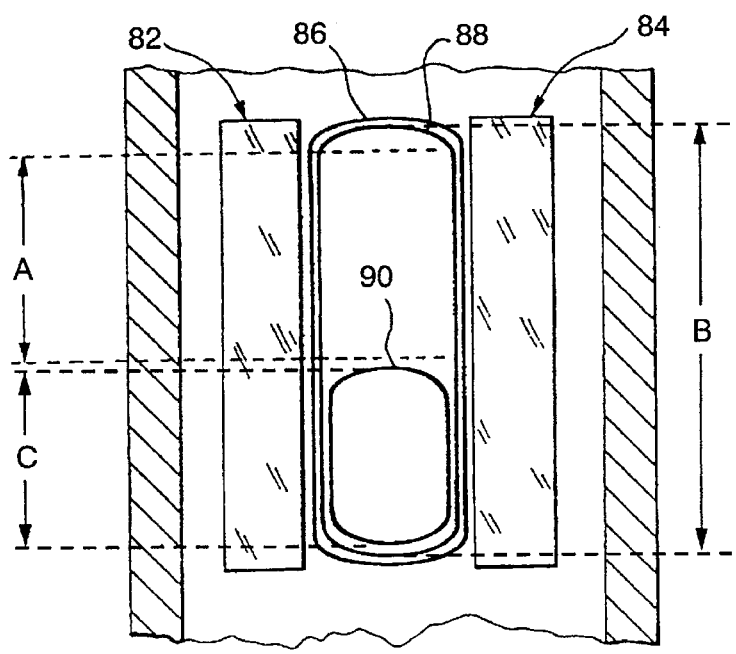

FIG. 5 Two saturators, in side view, according to a second embodiment, with the transmission, reception and counter-reception coils.

FIGS. 6a, 6b, 7b and 7b Two other possible configurations for the saturators and measuring means, which alternate along a longitudinal axis.

DETAILED DESCRIPTION OF EMBODIMENTS

Figure 1A:
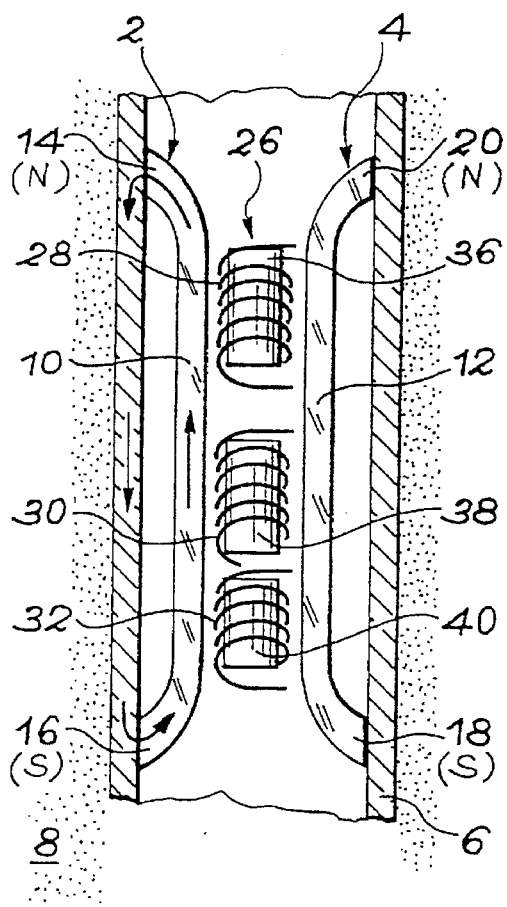
FIGS.1a and 1b Sectional and plan views of saturators according to a first embodiment of the invention, located in a drilled well.

According to a first embodiment of the invention, which will be described in conjunction with FIGS. 1a and 1b, a group of saturators is constituted by two magnetic circuits 2, 4, placed against the metallic, magnetic wall 6 of the casing of a well. Beyond said wall is a medium 8, whose electrical and/or magnetic properties are to be measured. The two elements of the saturator of FIG. 1a are in each case formed by a longitudinal, median part 10, 12, extended by two lateral ends 14, 16, 18, 20, which are inwardly curved with respect to the median part and which are in each case terminated by a surface to come into contact with the metal wall 6 of the casing.

The median parts of the magnetic circuits are parallel to one another. They are formed either from a soft magnetic material forming the core of an electromagnet not shown in the drawings, or a hard magnetic material serving as a permanent magnet, or a combination of both.

Figure 1B:
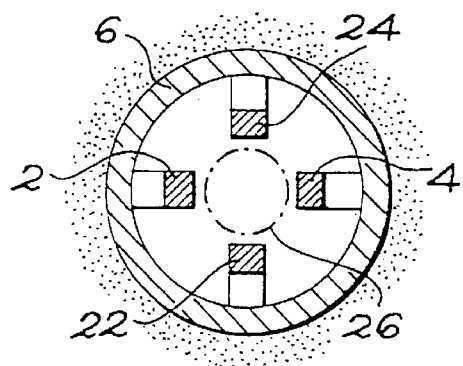

The same device is shown in FIG. 1B in plan view and it is possible to see not only two elements of a saturator, but instead four elements, arranged at 90° with respect to one another. According to another, not shown variant, it is also possible to have in this way six, eight or even more saturating elements, each having the form shown in FIG. 1a (a longitudinal part and two lateral ends curved inwards with respect to said longitudinal part), all the longitudinal parts being parallel to one another and all the lateral ends being terminated by a surface to come into contact with the metal wall of the tube 6.

Each magnetic circuit can either be a circuit supplied by an electromagnet, or a permanent magnet, e.g. of AlNiCo, or a combination of both.

As a result of the existence of a magnetic attraction force between the magnetic elements 2, 4, 22, 24 and the wall, this device makes it possible to reduce the gaps between the saturators and the tube to virtually zero and consequently reduce the magnetic energy necessary for the saturation of said tube. Moreover, any parasitic effect linked with a variation of the tube diameter is eliminated.

The transmission and reception means can e.g. be coils 28, 30, 32 arranged within an approximately cylindrical volume 26, which can be defined as the volume which is limited by on the longitudinal elements of the saturators, said longitudinal elements defining generatrixes of said cylinder. The induction 28 and reception 30, 32 coils are arranged, according to FIG. 1a, heightwise, approximately in accordance with the axis of the cylinder 26. In this configuration, the maximum flux passes into the spaces between the saturators. As shown in FIG. 1a, it is possible to use measurement flux focussing means 36, 38, 40, e.g. soft ferrite cores.

Figure 2A:
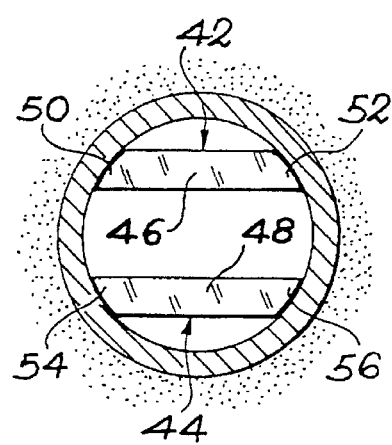
FIGS. 2a and 2b Another embodiment of a group of saturators according to the invention, in plan and side view, located in a drilled well.
Figure 2B:
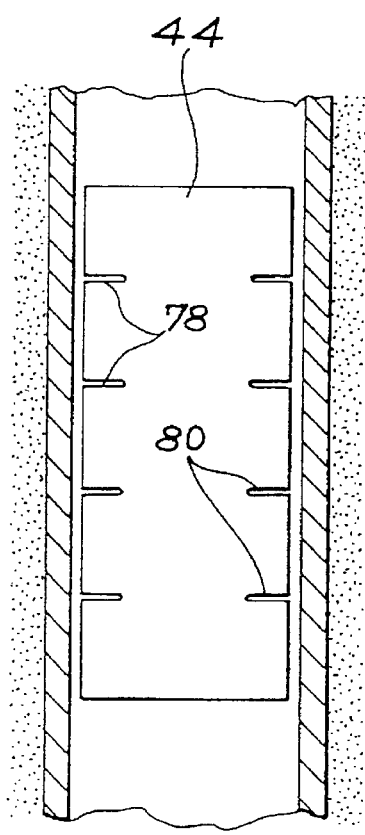

According to an embodiment illustrated in FIGS. 2a and 2b, the elements of a group of saturators are constituted by two magnetic circuits 42, 44, each circuit having a central part 46, 48, which is substantially plate-like and which is extended by two lateral parts 50, 52, 54, 56. The end of each of the lateral parts comes into contact with the inner wall of the tube, along a zone parallel to the tube axis.

4

The central part is either made from a soft magnetic material forming the core of an electromagnet not shown in the drawings, or a hard magnetic material serving as a permanent magnet, or a combination of both.

Figure 3A:
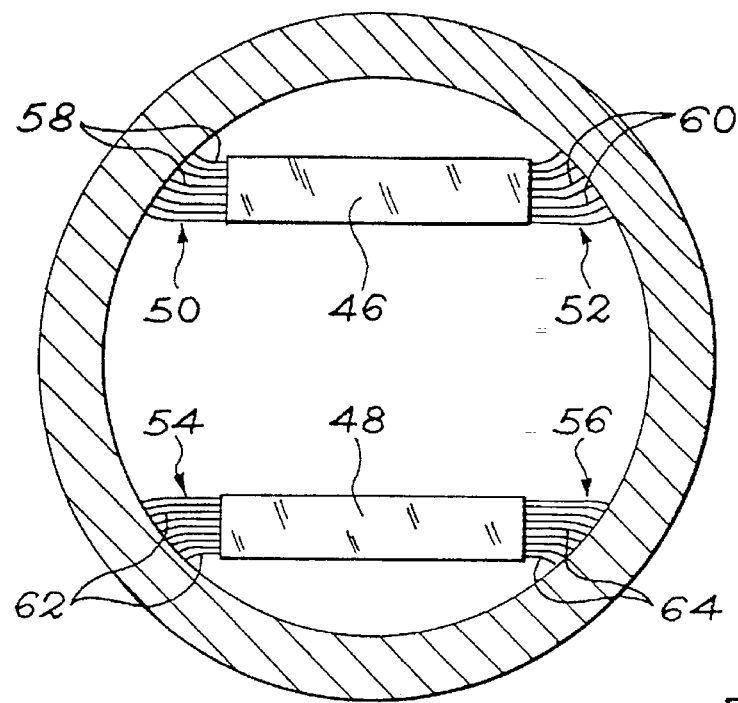
FIGS. 3a and 3b Two possible variants of magnetic circuits of the saturator according to the second embodiment.

As illustrated in FIG. 3a, the lateral parts 50, 52, 54, 56 can be constituted by magnetic sheets or laminations 58, 60, 62, 64 having a certain elasticity. The use of these sheets solves the problem of the magnetic contact between the magnetic circuit and the wall of the tube, when irregularities are present. The elasticity of the sheets enables the ends of the lateral parts to adapt to the different surface configurations encountered.

Figure 3B:
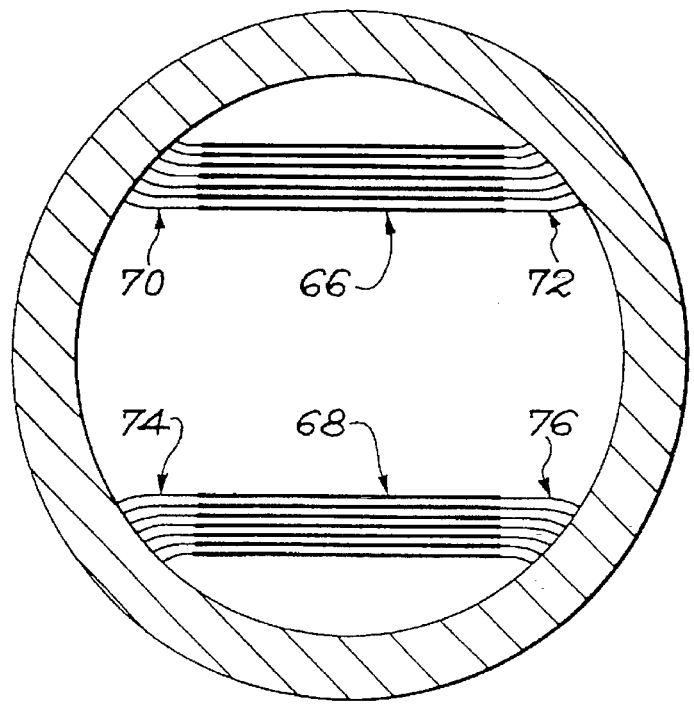

According to a variant illustrated in FIG. 3b, the plate-like, central part 66, 68 can be formed by magnetic sheets. Moreover, the central part can be extended by metal lamellas forming a spring 70, 72, 74, 76, which make it possible to channel the magnetic flux in the direction of the wall. These lamellas can be made from a single magnetic, elastic material or an appropriate stack of lamellas of two types, one type being of a soft material and the other of an elastic material. As shown in FIG. 2b, which is a side view of a saturator element, notches or cutouts 78, 80 can be provided on the sides of each saturator, so as to ensure a better contact with the wall, should the latter have irregularities.

In the second embodiment of FIGS. 2a to 3b, the polarities of the two facing saturator elements can be opposite or identical, so that different paths for the magnetic flux can be obtained.

In all cases, mechanical means can be used for spacing the saturators from the wall during the rise or fall of the device in the well. In the case of an electromagnet, it would also be possible to interrupt the power supply of the magnetic circuit during said raising and lowering operations.

Figure 4:
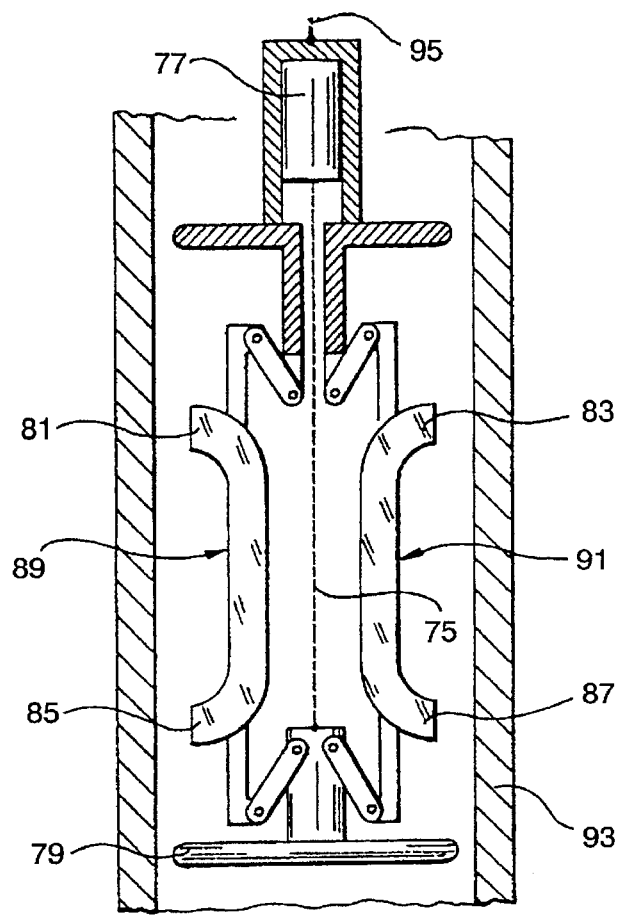
FIG. 4 A mechanism for spacing the saturators from the wall.

An example of a device for removing the magnetic circuits from the wall is illustrated in FIG. 4. An electric jack 77 makes it possible to raise a spacer 79 by means of a cable 75. The raising movement leads to a folding of the arms 81, 83, 85, 87 and brings the circuits 89, 91 towards the axis of the device and the tube 93 forming the wall. The complete device is suspended on a cable 95. The induction and measuring coils are not shown in FIG. 4, but can be arranged in the manner shown in FIG. 1a. Finally, the same device can be used for the saturators according to the second embodiment (FIGS. 2a, 2b, 3a, 3b).

FIG. 5 shows two plate-like saturators 82, 84 (second embodiment). These two elements are shown from the side and between them are located signal induction and reception means, e.g. a transmission coil 86, whose axis is perpendicular to that of the tube, a reception coil 88 and a counter-reception coil 90, which are also oriented perpendicular to the longitudinal axis of the tube. The area of interest in the medium located beyond the tube is then the area designated by the letter A in FIG. 5.

Such measurements using a transmission coil, a reception coil and a counter-reception coil make it possible, by difference, to eliminate the effect of the direction flux of the transmission coil on the reception coil in the 30 detected signal, as is explained in the aforementioned article by H. G. Doll. Referring specifically to FIG. 5, reception coil 88 receives signals from region B whereas the counter-reception coil 90 receives signals from region C. The: signal of interest for region A is therefore signal from B minus signal from C (A=B−C). Therefore, operatively the counter-reception coil 90 is the same as the reception coil 88, but its signal is subtracted from the reception coil 88. The detected signal is in quadrature with the alternating emission current.

The reception and counter-reception coils are sensitive to different volumes and therefore the measuring signal is proportional to the conductivity of the volume o the formation corresponding to the difference of the two volumes. Moreover, the device according to either of the two embodiments described hereinbefore, can have several reception and counter-reception coils for different heights, which permits the obtaining of different vertical resolutions linked with the length difference of the reception and counter-reception coils, or different investigation depths linked with the length of the transmission coil.

The maximum frequency usable with a device according to the invention is a few kilohertz. In principle, the intensity of the signal increases with the frequency and the latter is limited as a result of the skin effect. For standard casing dimensions, the radial thickness of the measuring volume is a few dozen centimeters, so that the frequency is limited to a few kilohertz.

In the case where the magnetic circuit of the saturator is partly formed by sheets, as in FIGS. 3a and 3b, and in order to limit the short-circuit effect due to the presence of said sheets in the vicinity of the transmission and reception coils, the thickness of the sheets is preferably 2 to 3 times greater than the thickness on which the skin effect occurs in the material from which the sheets are formed at the frequency at which the device is used. Thus, for a frequency of 10 kilohertz, the sheets must have a thickness of a few millimeters.

Two other configurations of the device, in the case of the second embodiment (plate-like saturator extended by lateral parts, whose end comes into contact with the inner wall of the tube) are illustrated in FIGS. 6a to 7b. In the latter, the references 92, 94 in each case represent in overall terms an assembly having induction means and reception means for a signal. This assembly can e.g. be an induction coil and a pair of reception-counter-reception coils. On either side of said assembly, in a longitudinal direction parallel to the tube, there are two saturation assemblies 96, 98, 100, 102. These assemblies are formed in the same way as described in conjunction with FIGS. 2a, 2b, 3a, 3b. Within the same assembly, the polarities of the magnetic circuits forming said assembly can either be in opposition (cf. FIG. 6b), or in parallel (cf. FIG. 7b).

In the case of FIGS. 6a and 6b, where the magnetic circuits of the same saturator have opposite polarities, the magnetic saturation field resulting therefrom has a radial configuration, as indicated by the arrows on the circumference of the tube of FIG. 6b. In the case where a transmission-detection assembly 92 is surrounded by two saturation assemblies 96, 98, the saturated area of the tube is then designated by the letter B in FIG. 6a. It is then possible to add, e.g. above the saturation assembly 96, another transmission-detection assembly 104 and then another saturator 106, which is itself formed from two magnetic circuits, whose polarities are oriented like those of the saturators 96, 98. This leads to an increase in the size of the saturated area of the tube.

In the version of FIG. 7a, the saturation assemblies 100, 102 are in each case formed by two magnetic circuits, whose polarity is identically oriented. This leads to a saturation field having an axial configuration, whose flow direction is that illustrated by the arrows in FIGS. 7a and 7b. As in the preceding case, it is possible to add above the saturator 100, another transmission-detection element 108, followed by another saturation element 110 formed in the same way as the elements 100, 102. Two neighbouring saturation elements, e.g. elements 100, 102 can have, as illustrated in FIG. 7a, polarization directions oriented at 180° from one another. However, it is also possible to orient the polarization directions at 90° from one another, or in accordance with any other angle. Thus, on each occasion there are different paths for the circulation of the magnetic saturation flux, which can be adapted by the expert according to circumstances.

It is obviously possible to generalize this teaching to a number N of saturation assemblies alternating with induction-reception assemblies.

The embodiments described in conjunction with FIGS. 6a to 7b make it possible to solve the problem of the overall dimensions of the saturators. When the energy necessary for saturating the walls is greater, it is necessary to use larger saturators and for this purpose use is made of one of the staged configurations which have just been described.

No matter which embodiment is chosen, the saturation elements, when they are formed by electromagnets, can be subject either to a constant induction, or to a variable induction e.g. by constant or time variable induction means 120. In the latter case, the saturator and the facing wall can be brought from a non-saturated state to a saturated state in alternating manner. This amounts to the formation of a magnetic "chopper" operating at a frequency of a dozen hertz. This frequency is limited to this order of magnitude as a result of the limited electric power and the magnetic time constant of the tube. The chopping phenomenon is increased as a result of the variation of the gap with the magnetic attraction force linked with the induction. Means for inducing in a coil of an electromagnet current pulses at a frequency of a few dozen hertz are known and will not be described in detail here. This operating procedure permits an improvement of the signal-to-noise ratio of the measurement. It is therefore possible to alternately perform a measurement with a tube in the saturation state and then a measurement with a tube in the non-saturation state and then form the difference between the two series of measured signals, so as to permit the elimination of external interference.

We claim:

1. Device for the induction measurement of a medium, adjacent a substantially cylindrical, metallic, magnetic walled well casing having a cylindrical axis, said device comprising:

means for magnetically saturating said magnetic wall, comprising at least two magnetic circuits for direct application to said magnetic wall, each of said magnetic circuits having a plate-like central portion, situated between two lateral portions, each lateral portion having a lateral end for contact with said wall, along a zone parallel to the cylindrical axis of said well, means for inducing an induction signal in said medium beyond the magnetic wall, after magnetic saturation of said magnetic wall, and, means for receiving a measurement signal retransmitted by said medium in response to said induction signal.

2. Device according to claim 1, wherein said central portion is formed of a material selected from the group consisting of a soft magnetic material forming the core of an electromagnet, a hard magnetic material serving as a permanent magnet, and a combination thereof.

3. Device according to claim 1, wherein said central portion is formed by magnetic sheets.

4. Device according to claim 1, wherein said lateral portions comprise magnetic sheets.

5. Device according to claim 1, wherein said lateral portions comprise metallic spring elements.

6. Device according to claim 1, wherein cut-outs are formed in at least one of the lateral portions of at least one of said magnetic circuits.

7. Device according to claim 1, wherein said at least two magnetic circuits are arranged substantially in parallel.

8. Device according to claim 7, wherein said means for inducing an induction signal and said means for receiving a measurement signal are located between said at least two magnetic circuits.

9. Device according to claim 1, and comprising a plurality of said means for magnetically saturating said magnetic wall, each of said means for magnetically saturating being arranged according to a common axis, at a certain mutual distance, and said means for inducing an induction signal and said means for receiving a measurement signal being located in a free space between two neighboring saturation assemblies.

10. Device according to claim 9, wherein each of said magnetic circuits is arranged so as to have a same magnetic orientation.

11. Device according to claim 9, wherein the magnetic orientations of two adjacent assemblies are arranged at 180° with respect to one another.

12. Device according to claim 9, wherein the magnetic orientations of two adjacent assemblies are arranged at 90° with respect to one another.

13. Device according to claim 1, also having means for subjecting the saturators to a time-variable induction at a frequency of a few dozen hertz.

* * * * *